US012679674B1

(12) United States Patent
Mayya et al.

(10) Patent No.: US 12,679,674 B1
(45) Date of Patent: Jul. 14, 2026

(54) STABILITY PREDICTION FOR THREE DIMENSIONAL ROBOTIC BIN PACKING

(71) Applicant: Amazon Technologies, Inc., Seattle, WA (US)

(72) Inventors: Siddharth Mayya, East Boston, MA (US); Bryan Masson, Marlborough, MA (US); Saraswathi Nambi, Natick, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 435 days.

(21) Appl. No.: 18/520,201

(22) Filed: Nov. 27, 2023

(51) Int. Cl.
 *B65G 61/00* (2006.01)
 *B25J 9/16* (2006.01)
(52) U.S. Cl.
 CPC ............ *B65G 61/00* (2013.01); *B25J 9/1697* (2013.01)
(58) Field of Classification Search
 CPC ................................ B65G 61/00; B25J 9/1697
 See application file for complete search history.

(56) References Cited

U.S. PATENT DOCUMENTS

| | | | | |
|---|---|---|---|---|
| 9,381,645 | B1 * | 7/2016 | Yarlagadda | .......... B65G 1/1378 |
| 10,235,653 | B1 * | 3/2019 | Stubbs | ................. G06Q 10/087 |
| 11,772,833 | B1 * | 10/2023 | Shi | ............................ B65B 5/08 |
| | | | | 700/259 |
| 12,330,304 | B2 * | 6/2025 | Sriraman | ........... G05B 19/4155 |
| 12,378,078 | B1 * | 8/2025 | Kalm | ....................... B65G 1/06 |
| 12,421,054 | B2 * | 9/2025 | Matsuoka | ............ B25J 15/0052 |
| 12,437,441 | B2 * | 10/2025 | Haven | .................... B25J 9/1697 |

OTHER PUBLICATIONS

Wikipedia contributors; "Quickhull"; Wikipedia, The Free Encyclopedia; Apr. 25, 2023; Retrieved from https://en.wikipedia.org/wiki/Quickhull on Nov. 27, 2023; 3 pgs.

* cited by examiner

*Primary Examiner* — Patrick H Mackey
(74) *Attorney, Agent, or Firm* — K&L Gates LLP

(57) ABSTRACT

In various examples, systems and methods for stability prediction for 3D robotic bin packing are described. A set of contact points for a first item at a first candidate placement position may be determined. A first contact point having a minimum value along a first coordinate dimension and a second contact point having a maximum value along the first coordinate dimension may be determined. A third contact point that is a maximum distance between a line between the first contact point and the second contact point may be determined. A determination may be made whether a centroid of the first item is within a triangle defined by the first contact point, the second contact point, and the third contact point. A stability of the first item at the first candidate placement position may be determined based on the location of the centroid.

20 Claims, 10 Drawing Sheets

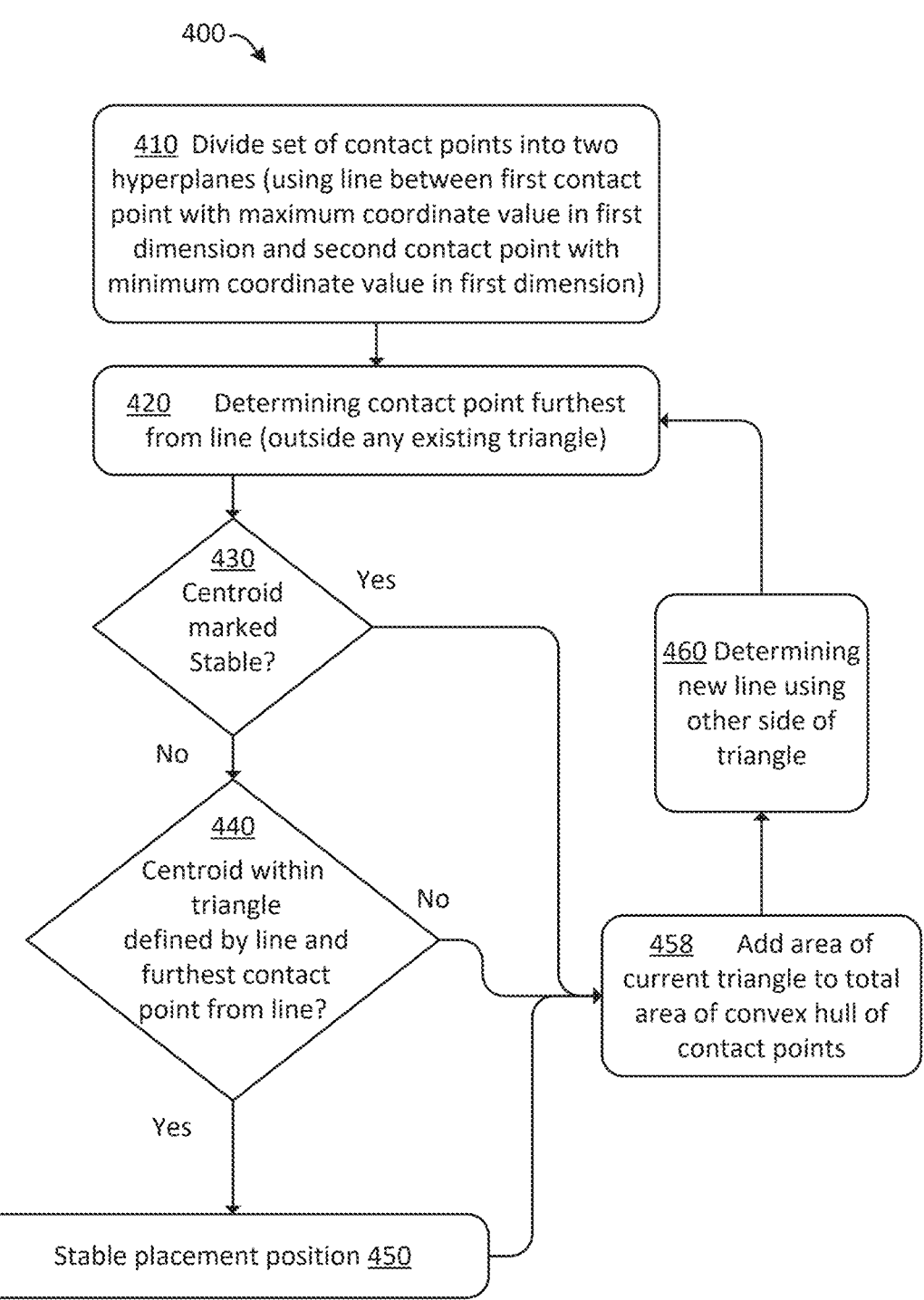

400

410 Divide set of contact points into two hyperplanes (using line between first contact point with maximum coordinate value in first dimension and second contact point with minimum coordinate value in first dimension)

420 Determining contact point furthest from line (outside any existing triangle)

430 Centroid marked Stable?

Yes

No

440 Centroid within triangle defined by line and furthest contact point from line?

No

Yes

460 Determining new line using other side of triangle

458 Add area of current triangle to total area of convex hull of contact points Stable placement position 450

FIG. 4

STABILITY PREDICTION FOR THREE DIMENSIONAL ROBOTIC BIN PACKING

BACKGROUND

Robotic systems can be used to move items and/or containers of items from one location to another. Robotic arms and/or other robotic tools may perform various item manipulations. For example, robotic arms may be used to sort items by removing an item from one location and placing the item in a different, target location. Systems of such robots can be designed and deployed to provide desired tasks such as item processing and sortation.

BRIEF DESCRIPTION OF DRAWINGS

FIG. 4 is a flowchart illustrating an example of a stability prediction algorithm, in accordance with various aspects of the present disclosure.

DETAILED DESCRIPTION

In the following description, reference is made to the accompanying drawings that illustrate several example embodiments of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

In various examples, robotic manipulation systems such as robotic arms may be used to manipulate items in a variety of contexts such as sortation, unpacking, packing, item manipulations in hazardous and/or inhospitable environments, etc. For example, robotic manipulators (e.g., robotic arms and/or other robotic sortation devices) may be used to grasp or otherwise select items and place the item into a bin or other container. The bin or container may include other items of non-uniform shape and size. Depending on the position selected for placement of the item, the package may topple over or may remain where it is placed by the robotic manipulator. Items that topple over may be damaged and/or may land in suboptimal positions, potentially compromising the efficacy of the packing process as additional items are consolidated into the container. Thus, while evaluating the relative quality of various candidate placement positions within a container, it would be advantageous for a robotic manipulator to reason about the stability of different candidate placement positions as a function of the shape of the object being placed as well as the topography of the item pile already present in the container. At scale, this prediction needs to happen hundreds or thousands of times per item placement. Additionally, it may be advantageous to perform these predictions quickly in order to avoid introducing latency in the robot's ability to pack containers quickly.

The ability to accurately predict package placement stability and account for it in robotic decision making is closely linked with how densely containers can be packed. In large scale facilities (e.g., sortation centers and/or fulfillment centers), small changes in the percent of gross container utilization can lead to large gains in terms of efficient packing and processing times.

Figure 1:
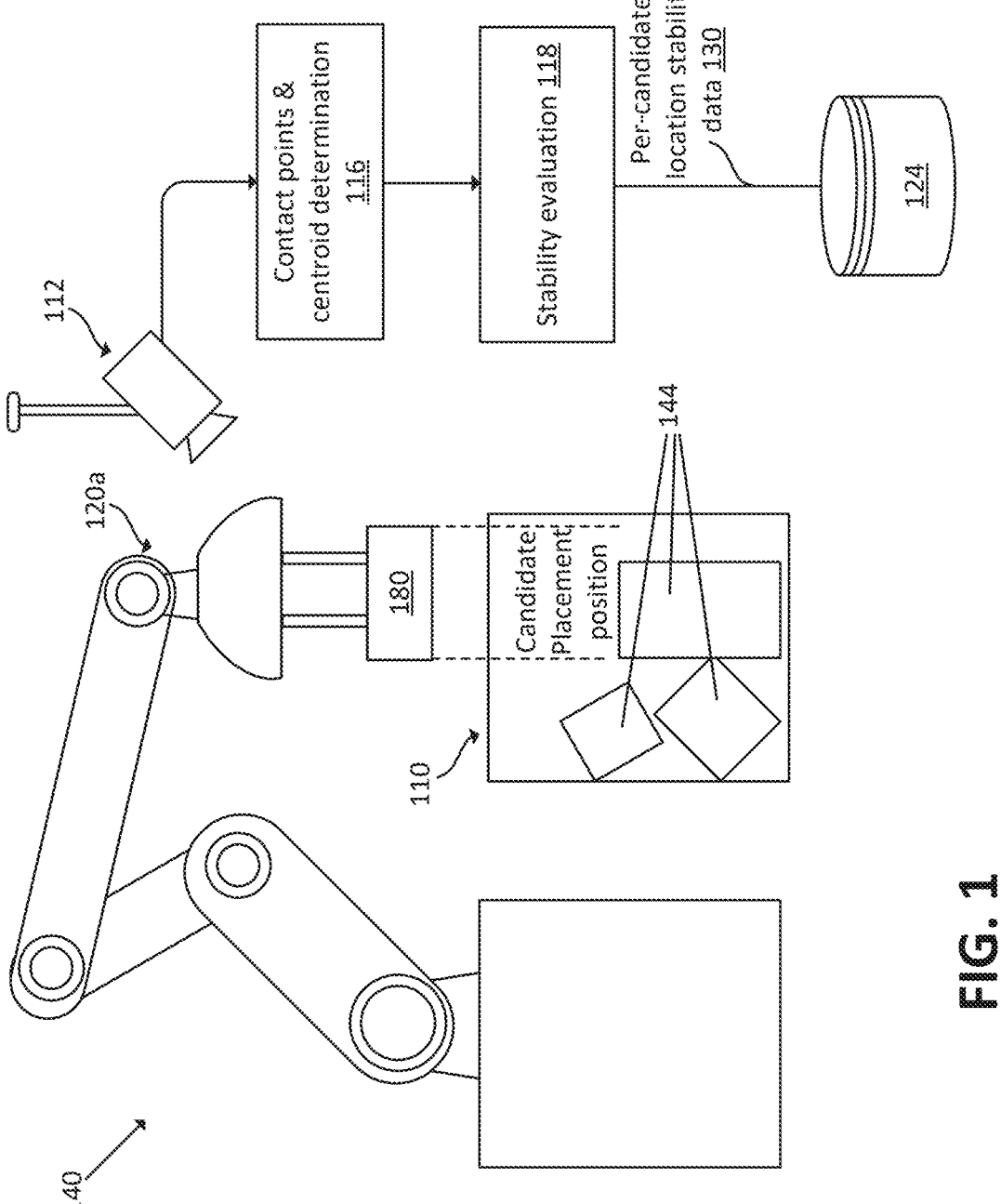
FIG. 1 is a diagram of an example robotic system including a stability evaluation component, according to various aspects of the present disclosure.

FIG. 1 is a diagram of an example robotic system (e.g., a sortation system) including a stability evaluation component 118, according to various aspects of the present disclosure. In the example of FIG. 1, a robot 140 (e.g., a robotic arm with an end-of-arm tool 120a) may be tasked with packing items (including item 180) into a container 110 (e.g., a bin, tote, box, etc.) or onto a different surface (e.g., on a palette).

In the example of FIG. 1, one or more camera devices 112 may monitor the work station of the robot 140 (e.g., a robotic sortation station) and may capture images of the current item content of the container 110 (e.g., the items 144) as well as of the current item 180 to be placed into the container 110. As shown in block 116, the image data may be used to calculate the set of contact points between the item 180 and other items 144 (and/or between the item 180 and the surfaces of the container 110 itself). Additionally, at block 116, the image data of the item 180 may be used to determine the centroid of the item 180.

Figure 2:
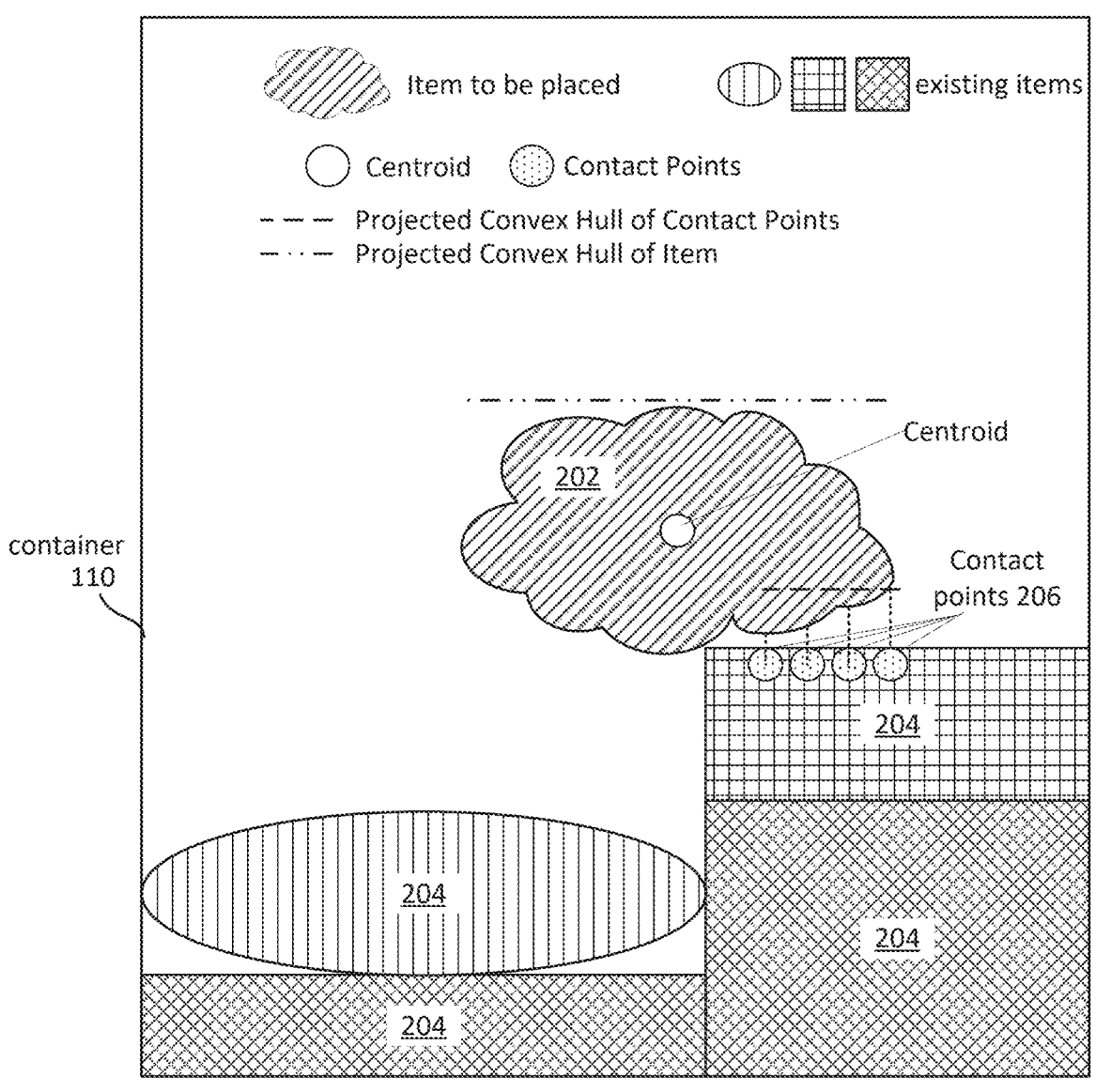
FIG. 2 depicts an example candidate placement position of an item in a container, in accordance with various aspects of the present disclosure.

In various examples, the contact points may be calculated by hypothetically placing item 180 on top of the items 144 at a candidate placement location, and calculating a set of points which represent the region where item 180 is resting on items 144. This is done by comparing the z-height of the bottom-most points of item 180 at this candidate placement location and comparing it against the top most points of items 144. If the former is smaller than the latter, then these points are considered as the contact points. This is represented in FIG. 2 by the points 206. The centroid of item 180 is calculated as the geometric center of the item, i.e., by individually averaging the x, y, and z coordinates of all points representing the item (as captured by camera devices pointed towards item 180).

As described in further detail below, the stability evaluation component 118 may evaluate each candidate placement position for the item 180. This may include not only different positions in the x-y coordinate plane (e.g., the horizontal plane of the container 110 that is parallel to the floor), but also different rotations of the item 180 for the same locations in the x-y coordinate plane. For each candidate placement position, the stability evaluation component 118 may generate a binary stability score indicating stable or not stable. Additionally, in some examples, for stable candidate placement positions, the stability evaluation component 118 and/or another component may determine a score representing a degree to which the stable candidate placement position is stable. The per-candidate location stability data 130 may be stored in non-transitory computer-readable memory 130. The per-candidate location stability data 130 may be used to assess where each item (e.g., item 180) should be placed in the container 110.

Stability Metrics

In order to compute the stability metrics, the set of contact points between the item (at the candidate placement position being evaluated) and the packages already in the container (and/or the container itself) is determined. These contact points define the support plane that the item will have when it is placed, and will ultimately determine if the item will stay stable or will move due to gravity. FIG. 2 provides a visualization of the contact points between the item 202 and the existing items 204 already in the container. The stability metrics are defined as:

Stability Metric 1: One technique for determining whether an item placement at a given candidate placement position is stable is to determine if the centroid of the item is within the convex hull defined by the contact points 206. This computation may be made after projecting all contact points and the centroid onto the x,y coordinate plane. If the centroid is outside of the convex hull, the candidate placement position may be deemed an unstable placement position.

Stability Metric 2: Another metric may be used to determine the degree to which a stable candidate placement position (as determined using metric 1) is stable. This may be computed by determining the ratio of the area of the convex hull of the set of contact points and the convex hull of the item, both projected onto the x,y coordinate plane. In FIG. 2, this calculation may be performed by dividing the area of the projected convex hull of the contact points (represented using the dash-dash-dash pattern) by the projected convex hull of the item (representing using the dot-dot-dash-dot-dot-dash pattern).

Thus, in order to compute these stability metrics, the convex hull of the contact points 206 is first computed. A traditional approach of assessing stability is to (A) compute the convex hull of the contact points between the item and the container, and then (B) check if the centroid of the item lies inside this convex hull. However, these two steps are computationally intensive. Step (A) typically has a O(N log(N)) complexity, where N is the number of contact points. Step (B) involves solving of a linear optimization program with approximately $O(n^{2.5})$ complexity where n is the number of points in the convex hull.

The stability evaluation techniques and systems described herein (including stability evaluation component 118) rapidly evaluates the above-defined stability metrics while skipping the explicit convex hull computation steps, without loss of accuracy. More specifically, the stability evaluation techniques and systems described herein collapse the two steps of computing the convex hull and performing a set-membership test into a single step by leveraging the construction of the convex hull itself to perform the membership test. The various systems and techniques described herein evaluate whether a contact point lies inside the convex hull, while also computing the area of the convex hull.

FIGS. 3A-3E depict techniques used during stability prediction for a given candidate placement position, in accordance with various aspects of the present disclosure. FIGS. 3A-3E represent various steps in an algorithm used to evaluate whether a contact point lies inside the convex hull, while also computing the area of the convex hull.

Step 1: Given the destination container (represented by the box in FIG. 3A) and the item to be placed in the destination container, the set of contact points between the item at the placement location and the destination container may be calculated. These N points (black dots in FIG. 3A) may be denoted as a set of contact points C. Note that for this computation, these contact points may be projected onto the XY plane in the container reference frame, so $C \subset R^2$.

Step 2: Find points $p_{min}$, $p_{max} \in C$ denoting the contact points with the minimum and maximum x-coordinates within C, respectively. It should be noted, that this step may instead use the contact points with the minimum and maximum y-coordinates (or other relevant dimension), according to the desired implementation. In the example depicted in FIG. 3B, a line is depicted between the points $p_{min}$, $p_{max}$.

Step 3: For each of the two hyperplanes created by the line between $p_{min}$ and $p_{max}$ (e.g., one hyperplane above the line and one hyperplane below the line), find the point farthest from the line segment on each side. For an arbitrary side (e.g., the side above the line in FIG. 3C), this contact point is denoted as $p_d$. The same computations and recursion apply for the other side (e.g., the hyperplane below the line between $p_{min}$ and $p_{max}$).

Figure 3A:
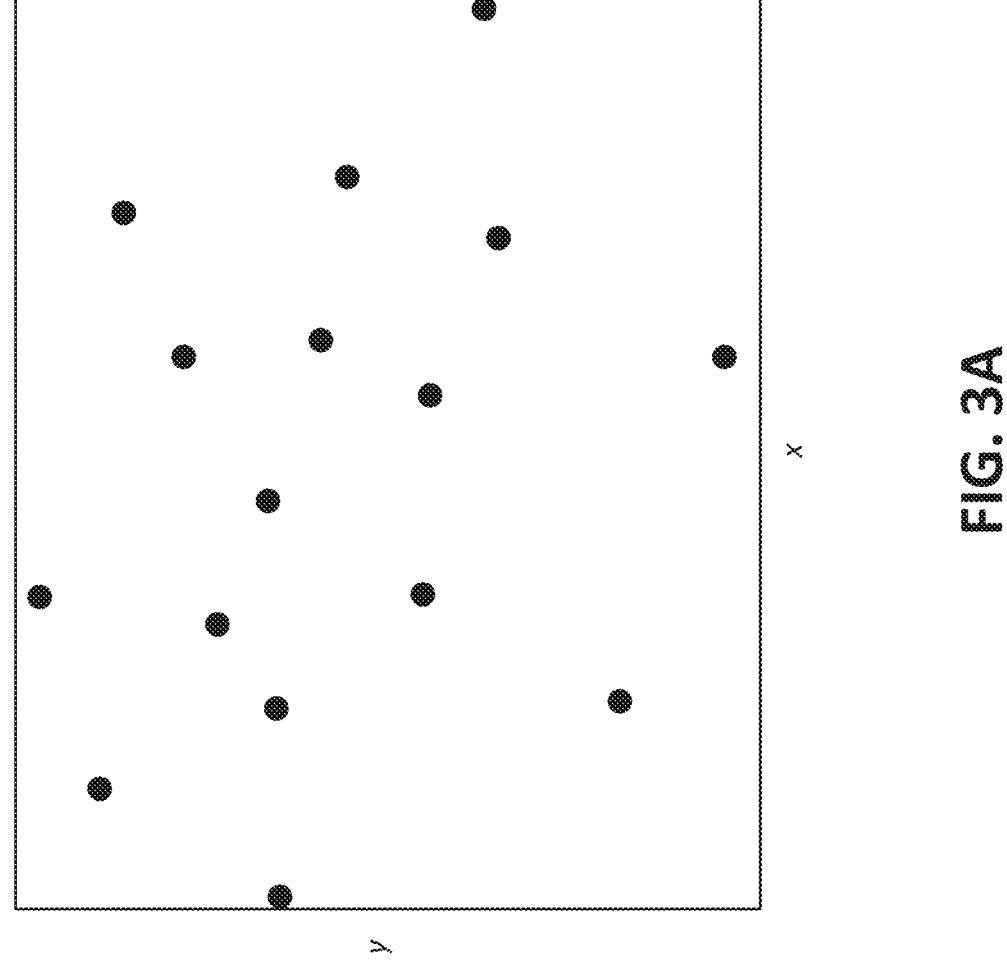
FIGS. 3A-3E depict techniques used during stability prediction for a given candidate placement position, in accordance with various aspects of the present disclosure.
Figure 3B:
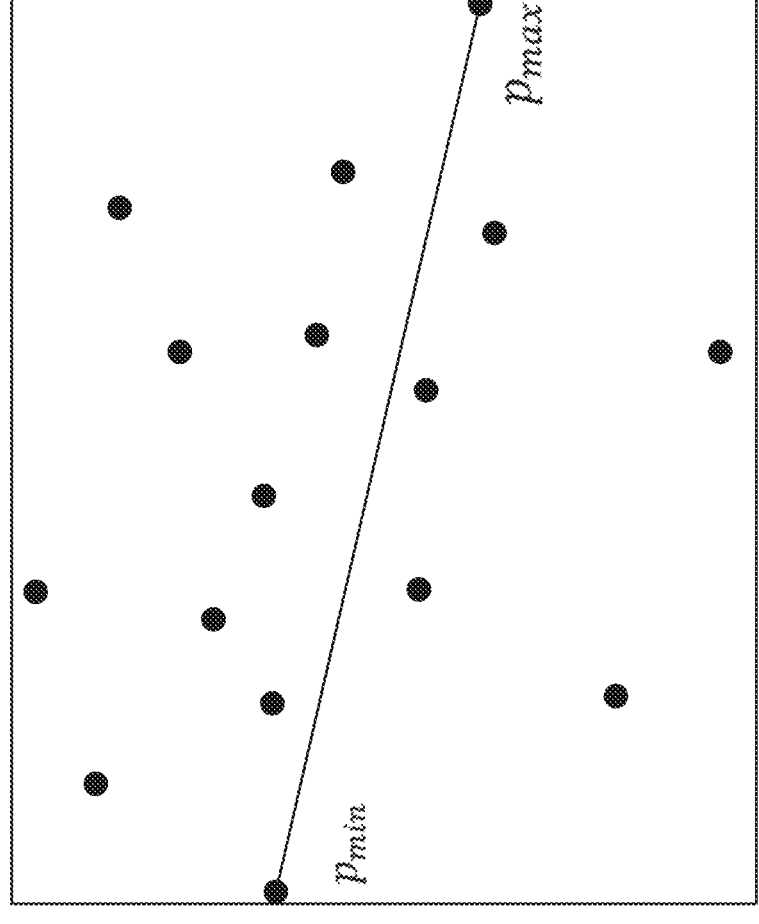
Figure 3C:
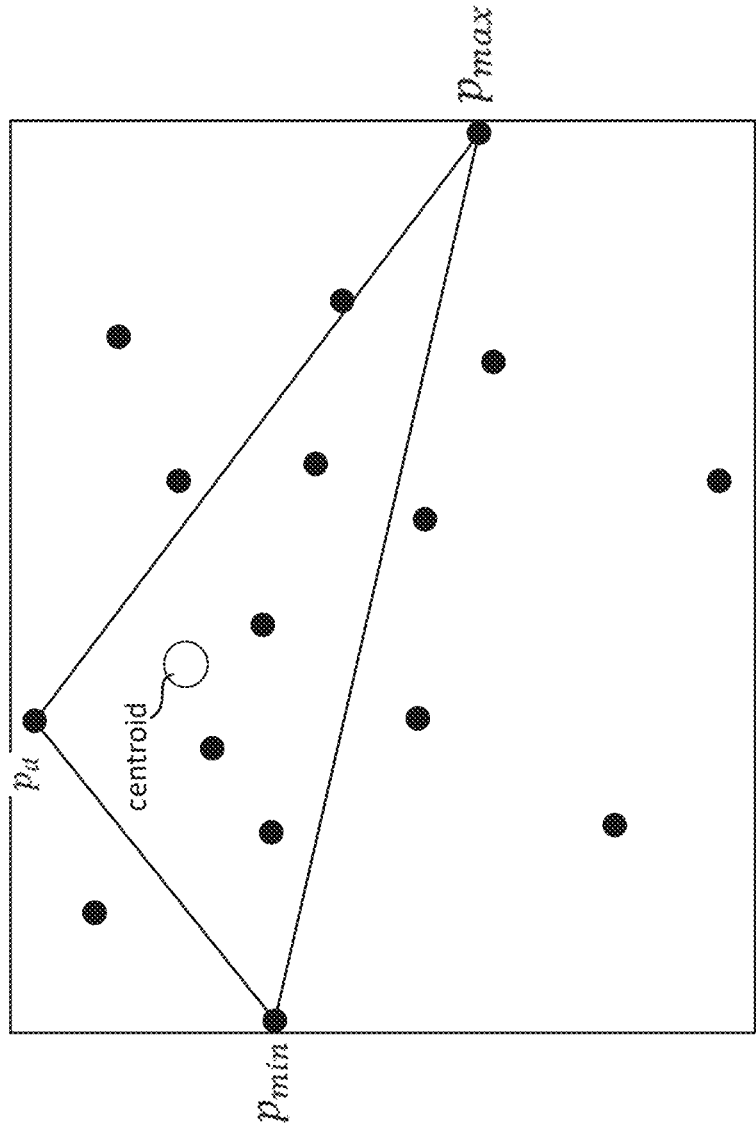

Step 4: Draw line segments between ($p_{min}$, $p_d$) and ($p_{max}$, $p_d$). These line segments are shown in FIG. 3C.

Step 5: Let $s(p_1, p_2, p_t) | \{-1,0,1\}$ denote a function which calculates which side of the line segment ($p_1$, $p_2$) the point $p_t$ lies. A value of 0 indices that $p_t$ lies on the line.

Step 6: The variables $s_1 = s(p_{min}, p_d, p_{max})$, $s_2 = s(p_{max}, p_d, p_{min})$, $s_3 = s(p_{min}, p_{max}, p_d)$ denote the sides which are guaranteed to point towards the interior of the triangle formed by the three points.

Step 7: Centroid Membership Test If $s(p_{min}, p_d, I_c) = s_1$ and $s(p_{max}, p_d, I_c) = s_2$ and $s(p_{min}, p_{max}, I_c) = s_3$ then the centroid $I_c$ is guaranteed to lie inside the convex hull of contact points (since it lies inside a triangle that is fully enclosed inside the convex hull).

In the example of FIG. 3C, the triangle is evaluated using the centroid membership test to determine if the centroid is inside the depicted triangle. Note that the computational complexity of this evaluation is greatly reduced relative to determining whether the centroid is within the convex hull of the contact points (which requires a linear optimization problem to be solved with approximately $O(n^{2.5})$ complexity where n is the number of points in the convex hull.

Step 8: Convex Hull of Contact Points Area Computation: Add Area $A(p_{min}, p_{max}, p_d)$ to total area.

Figure 3D:
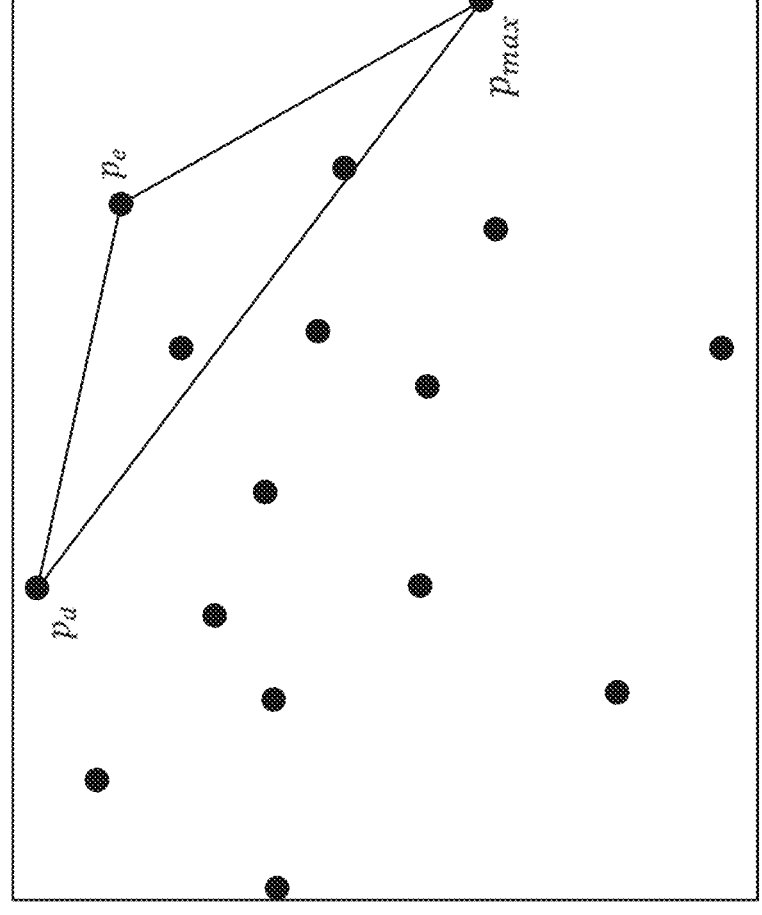

Step 9: For the hyperplanes created by ($p_{min}$, $p_d$) and ($p_{max}$, $p_d$), repeat the process starting from Step 2. Only recursively compute the farthest point on side $-s_1$ and $-s_2$ respectively, since only points on these sides can be part of the convex hull. Continue until no points are left. An example of Step 9 is depicted in FIG. 3D. For the line of the triangle between $p_{max}$, $p_d$, the farthest point pe is determined. The centroid membership test (Step 7) is again performed for this new triangle and the area is added to the total area of the convex hull of the contact points (Step 8).

Step 10: Return centroid membership boolean, and total convex hull area. If the centroid is within any of the triangles determined using the above steps, the candidate placement position is deemed to be stable (Stability Metric 1). Additionally, the degree to which this candidate placement position is stable can be determined (Stability Metric 2). In some examples, if Stability Metric 2 is below a threshold stability score (e.g., a threshold ratio), the candidate placement position may be rejected.

Figure 3E:
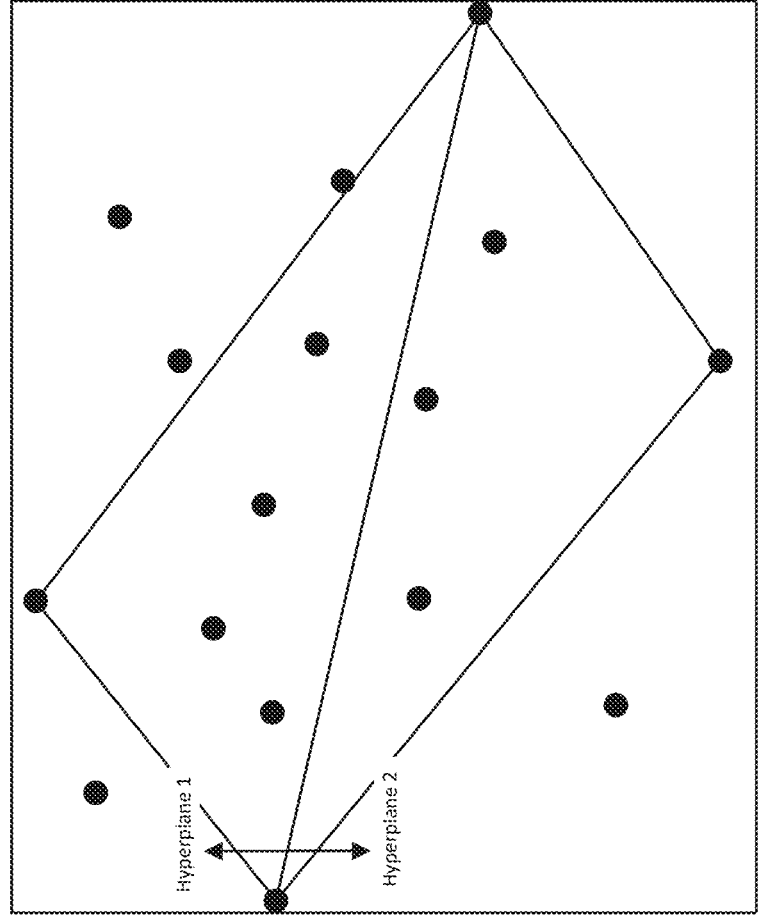

FIG. 3E depicts two hyperplanes above and below the line between $p_{min}$, $p_{max}$. The algorithm above may be performed in parallel for hyperplane 1 and hyperplane 2.

FIG. 4 is a flowchart describing an example process 400 illustrating an example of a stability prediction algorithm, in accordance with various aspects of the present disclosure. Those portions of FIG. 4 that have been previously discussed in reference to FIGS. 1-3E may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 410, at which the set of contact points for the current candidate placement position may be divided into two hyperplanes using the line between a first contact point with a maximum coordinate value in a first dimension and a second contact point with a minimum coordinate value in the first dimension (e.g., $p_{max}$ and $p_{min}$—the contact point with the maximum x-coordinate value and the contact point with the minimum x-coordinate value among the set of contact points).

Processing may continue at action 420, at which the contact point $p_d$ that is the farthest from the current line (e.g., initially between $p_{max}$ and $p_{min}$) may be determined. At action 430, a determination may be made whether the centroid has already been marked stable. During the first iteration, the answer is No as the centroid membership test described above has not yet been performed. Processing may proceed to action 440.

At action 440, a determination may be made whether the centroid of the item to be placed is within the triangle defined by the current triangle (e.g., the initial triangle having vertices $p_{max}$, $p_d$, and $p_{min}$). If the centroid is within the triangle, the centroid may be marked stable and the candidate placement position may be determined to be stable (action 450—Stability Metric 1). Processing may proceed to action 458 at which the area of the new triangle may be added to the area of the convex hull of the contact points.

Processing may continue to action 460, at which a new line using one of the other sides of the triangle (e.g., the line between $p_{max}$, $p_d$) may be used. Processing may return to action 420, at which a determination of the farthest contact point from the new line (e.g., pe from FIG. 3D) may be determined. A determination may be made at action 430 whether the centroid has previously been marked stable. If not, processing may proceed to action 440 and the centroid membership test may again be performed, as previously described. If the centroid has previously been marked stable, processing may proceed from action 430 to action 458 at which the area of the current triangle may be added to the total area of the convex hull of the contact points. This process may be repeated until all contact points have been processed (e.g., all points were either vertices of triangles or were within previous triangles). Once all contact points have been processed, stability metric 2 may then be evaluated using the total area of the convex hull of the contact points as described above.

Figure 5:
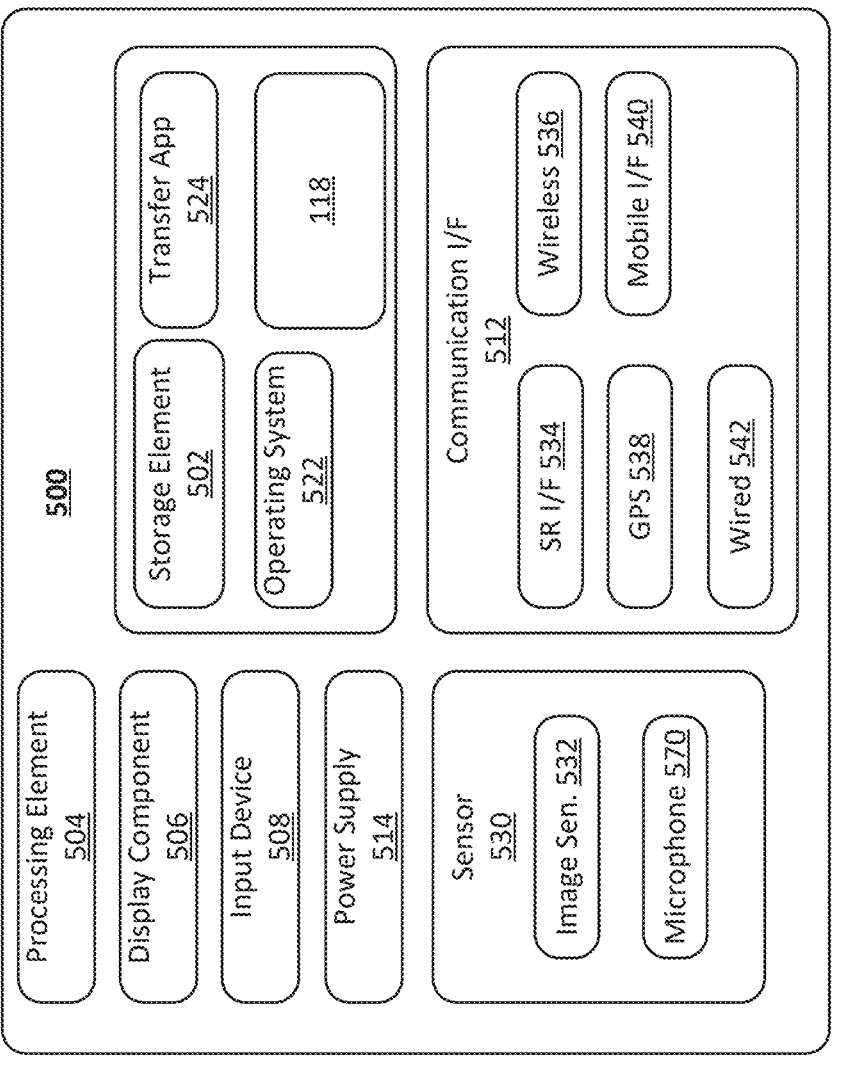
FIG. 5 is an example computing device architecture that may be used in accordance with various techniques described herein.

FIG. 5 is a block diagram showing an example architecture 500 of a computing device that may be used in accordance with various aspects of the present disclosure. For example, the stability evaluation component 118 may be implemented, at least in part, by the architecture 500. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs) and/or graphical processing units (GPUs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store computer-executable instructions configured to implement the stability evaluation component 118 and/or the various other techniques for stability metric determination, as described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images generated in accordance with the various techniques described herein. In various examples, the display component 506 may be a wearable display (e.g., in a headset, goggles, and/or glasses) that may display the various graphical highlight data, graphical navigational hints, text, other graphical data, etc., described herein. In some examples, the architecture 500 may include one or more speakers effective to output audio.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In various examples, the image sensor 532 may be effective to capture image and/or video frames that may be used to detect the various objects in the physical environment of the user.

As noted above, multiple devices may be employed in a single system. In such a multi-device system, each of the devices may include different components for performing different aspects of the system's processing. The multiple devices may include overlapping components. The components of the various computing device(s), as described herein, are exemplary, and may be located as a stand-alone device or may be included, in whole or in part, as a component of a larger device or system.

Figure 6:
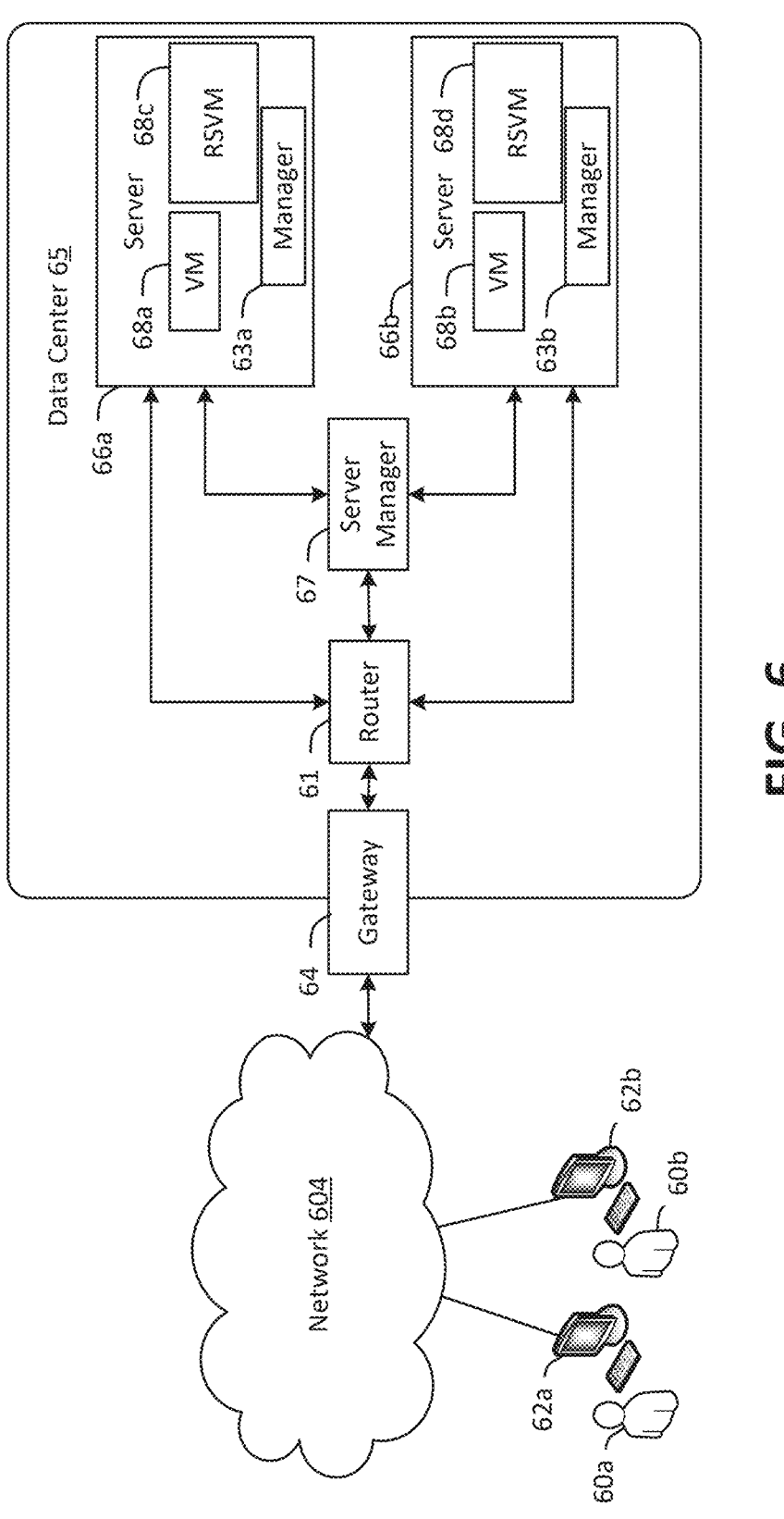
FIG. 6 is a diagram illustrating an example system for sending and providing data that may be used in accordance with the present disclosure.

An example system for sending and providing data that may be used to perform one or more of the various techniques described herein will now be described in detail. In particular, FIG. 6 illustrates an example computing environment in which the embodiments described herein may be implemented. For example, the computing environment of FIG. 6 may be configured to determine stability of package placement in containers as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via a computer communication network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various image processing techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 604. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   picking, by a robotic arm, a first item for placement in a first bin, the first bin containing at least one other item;
   determining, for a first candidate placement position in the first bin, a first set of contact points in an x-y plane, where the first item is projected to contact at least one of the first bin or the at least one other item when placed in the first candidate placement position, wherein the x-y plane is parallel to a bottom of the first bin;
   determining a first contact point of the first set of contact points with a minimum x-coordinate value among the first set of contact points;
   determining a second contact point of the first set of contact points with a maximum x-coordinate value among the first set of contact points;
   determining a first line between the first contact point and the second contact point;
   determining a third contact point that is a farthest contact point from the first line from among the first set of contact points;
   determining a centroid of the first item;

determining that the centroid is located outside of a first triangle with vertices comprising the first contact point, the second contact point, and the third contact point; and
   placing, by the robotic arm, the first item at a second candidate placement position in the first bin.

2. The method of claim 1, further comprising:
   determining a second line between the first contact point and the third contact point;
   determining a fourth contact point that is a farthest contact point from the second line;
   determining that the centroid is located inside of a second triangle with vertices of the first contact point, the third contact point, and the fourth contact point; and
   determining that the first candidate placement position is a stable candidate placement position based on the centroid being located inside of the second triangle.

3. The method of claim 1, further comprising:
   determining a first area of the first set of contact points;
   determining a second area of the first item in the x-y plane;
   determining a ratio of the first area to the second area;
   determining that the ratio is below a threshold ratio; and
   placing, by the robotic arm, the first item at the second candidate placement position in the first bin based at least in part on the ratio being below the threshold ratio.

4. A method comprising:
   picking, by a robotic manipulator, a first item for placement;
   determining, for a first candidate placement position, a first set of contact points for the first item placed at the first candidate placement position by the robotic manipulator;
   determining a first contact point among the first set of contact points having a minimum coordinate value along a first coordinate dimension;
   determining a second contact point among the first set of contact points having a maximum coordinate value along the first coordinate dimension;
   determining a first line between the first contact point and the second contact point;
   determining a third contact point that is a farthest contact point from the first line from among the first set of contact points;
   determining a centroid of the first item;
   determining that the centroid is located outside of a first triangle with vertices comprising the first contact point, the second contact point, and the third contact point; and
   placing, by the robotic manipulator, the first item at a second candidate placement position.

5. The method of claim 4, further comprising:
   determining, based at least in part on the centroid of the first item being located outside of the first triangle, that the first candidate placement position represents an unstable placement position for the first item.

6. The method of claim 4, further comprising:
   determining a second line between the first contact point and the third contact point;
   determining a fourth contact point that is a farthest contact point from the second line;
   determining that the centroid is located inside of a second triangle with vertices comprising the first contact point, the third contact point, and the fourth contact point; and
   determining that the first candidate placement position is a stable candidate placement position based on the centroid being located inside of the second triangle.

7. The method of claim 4, further comprising:

determining a first area of the first set of contact points;

determining a second area of the first item in a first plane;

determining a ratio of the first area to the second area;

determining that the ratio is below a threshold ratio; and placing, by the robotic manipulator, the first item at the second candidate placement position in the first bin based at least in part on the ratio being below the threshold ratio.

8. The method of claim 4, further comprising:

determining a second line between the first contact point and the third contact point; and determining a second triangle, different from the first triangle, wherein one side of the second triangle comprises the second line.

9. The method of claim 8, further comprising:

determining that the centroid is located within the second triangle; and determining that the first candidate placement position is a stable candidate placement position.

10. The method of claim 9, further comprising:

determining a degree of stability of the first candidate placement position based at least in part on an area of the first set of contact points and an area of the first item.

11. The method of claim 10, further comprising:

selecting the second candidate placement position over the first candidate placement position based on the degree of stability.

12. The method of claim 4, wherein the third contact point is the farthest contact point from the first line among a set of points in a first hyperplane on a first side of the first line, the method further comprising:

determining a fourth contact point that is a farthest contact point from the first line among a set of points in a second hyperplane on a second side of the first line, wherein the determining the fourth contact point is performed in parallel with the determining the third contact point; and determining that the centroid is located outside of a second triangle with vertices comprising the first contact point, the second contact point, and the fourth contact point, wherein the determining that the centroid is located outside of the second triangle is performed in parallel with the determining that the centroid is located outside of the first triangle.

13. A system comprising:

at least one processor; and non-transitory computer-readable memory storing instructions that, when executed by the at least one processor, are configured to:

pick, by a robotic manipulator, a first item for placement;

determine, for a first candidate placement position, a first set of contact points for the first item placed at the first candidate placement position by the robotic manipulator;

determine a first contact point among the first set of contact points having a minimum coordinate value along a first coordinate dimension;

determine a second contact point among the first set of contact points having a maximum coordinate value along the first coordinate dimension;

determine a first line between the first contact point and the second contact point;

determine a third contact point that is a farthest contact point from the first line from among the first set of contact points;

determine a centroid of the first item;

determine that the centroid is located outside of a first triangle with vertices comprising the first contact point, the second contact point, and the third contact point; and place, by the robotic manipulator, the first item at a second candidate placement position.

14. The system of claim 13, the non-transitory computer-readable memory storing further instructions that, when executed by the at least one processor, are further effective to:

determine, based at least in part on the centroid of the first item being located outside of the first triangle, that the first candidate placement position represents an unstable placement position for the first item.

15. The system of claim 13, the non-transitory computer-readable memory storing further instructions that, when executed by the at least one processor, are further effective to:

determine a second line between the first contact point and the third contact point;

determine a fourth contact point that is a farthest contact point from the second line;

determine that the centroid is located inside of a second triangle with vertices comprising the first contact point, the third contact point, and the fourth contact point; and determine that the first candidate placement position is a stable candidate placement position based on the centroid being located inside of the second triangle.

16. The system of claim 13, the non-transitory computer-readable memory storing further instructions that, when executed by the at least one processor, are further effective to:

determine a first area of the first set of contact points;

determine a second area of the first item in a first plane;

determine a ratio of the first area to the second area;

determine that the ratio is below a threshold ratio; and place, by the robotic manipulator, the first item at the second candidate placement position in the first bin based at least in part on the ratio being below the threshold ratio.

17. The system of claim 13, the non-transitory computer-readable memory storing further instructions that, when executed by the at least one processor, are further effective to:

determine a second line between the first contact point and the third contact point; and determine a second triangle, different from the first triangle, wherein one side of the second triangle comprises the second line.

18. The system of claim 17, the non-transitory computer-readable memory storing further instructions that, when executed by the at least one processor, are further effective to:

determine that the centroid is located within the second triangle; and determine that the first candidate placement position is a stable candidate placement position.

19. The system of claim 18, the non-transitory computer-readable memory storing further instructions that, when executed by the at least one processor, are further effective to:

determine a degree of stability of the first candidate placement position based at least in part on an area of the first set of contact points and an area of the first item.

20. The system of claim 19, the non-transitory computer-readable memory storing further instructions that, when executed by the at least one processor, are further effective to:

select the second candidate placement position over the first candidate placement position based on the degree of stability.

\* \* \* \* \*